United States Patent
Miyamoto

(10) Patent No.: US 8,170,201 B2
(45) Date of Patent: *May 1, 2012

(54) POWER FEEDING SYSTEM FOR TELEPHONE TERMINAL IN LAN

(75) Inventor: Katsuhiko Miyamoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1273 days.

This patent is subject to a terminal disclaimer.

(21) Appl. No.: 11/808,056

(22) Filed: Jun. 6, 2007

(65) Prior Publication Data

US 2007/0237323 A1 Oct. 11, 2007

Related U.S. Application Data

(63) Continuation of application No. 10/726,511, filed on Dec. 4, 2003, now Pat. No. 7,242,764, which is a continuation of application No. 09/352,332, filed on Jul. 13, 1999, now Pat. No. 6,681,013.

(30) Foreign Application Priority Data

Aug. 19, 1998 (JP) .................................. 10-232419

(51) Int. Cl.
  *H04M 1/00* (2006.01)
  *H04M 9/00* (2006.01)

(52) U.S. Cl. .................... 379/413; 379/413.01; 379/324

(58) Field of Classification Search ............ 379/399.01, 379/400–401, 412, 413, 413.01, 413.02, 379/318, 322, 324

See application file for complete search history.

(56) References Cited

U.S. PATENT DOCUMENTS

| | | | |
|---|---|---|---|
| 5,076,763 | A | 12/1991 | Anastos et al. |
| 5,144,544 | A | 9/1992 | Jenneve et al. |
| 5,189,409 | A | 2/1993 | Okuno et al. |
| 5,353,009 | A | 10/1994 | Marsh et al. |
| 5,617,418 | A | 4/1997 | Shirani et al. |
| 5,652,893 | A | 7/1997 | Ben-Meir et al. |
| 5,790,363 | A | 8/1998 | Chaudhry |
| 6,018,452 | A | 1/2000 | Meyerhoefer et al. |
| 6,101,459 | A | 8/2000 | Tavallaei et al. |
| 6,456,625 | B1 | 9/2002 | Itoi et al. |
| 6,681,013 | B1 | 1/2004 | Miyamoto et al. |
| 7,242,764 | B2 * | 7/2007 | Miyamoto ................. 379/413 |

FOREIGN PATENT DOCUMENTS

| | | |
|---|---|---|
| JP | 4-345338 | 12/1992 |
| JP | 5-336127 | 12/1993 |
| WO | WO-96/23377 | 8/1996 |

* cited by examiner

*Primary Examiner* — Quoc D Tran

(74) *Attorney, Agent, or Firm* — Rabin & Berdo, P.C.

(57) ABSTRACT

Terminals are connected via cables in a star-shaped fashion with respect to a HUB in a LAN. Each of the cables includes therein signal lines and power feed lines. The HUB includes therein a power feed section. The power feed section and the power feed lines of each cable are connected to measure a value of current which flows in the power feed lines. If it is judged based on the measured current value that the terminal connected to the corresponding cable is a telephone terminal, the power feeding to the corresponding power feed lines is continued. On the other hand, if the terminal is judged to be a terminal other than the telephone terminal, the power feeding is stopped.

19 Claims, 4 Drawing Sheets

FIG. 2

|      | (S-2a) | (S-2b) | (S-3a) | (S-3b) | (S-5a) | (S-5b) | (S-6a) | (S-6b) | (S-9a) | (S-9b) |      |
|---|---|---|---|---|---|---|---|---|---|---|---|
|      |        |        |        |        |        |        |        |        |        |        | ~12-1 |
|      |        |        |        |        |        |        |        |        |        |        | ~12-2 |
|      |        |        |        |        |        |        |        |        |        |        | ~12-3 |
|      |        |        |        |        |        |        |        |        |        |        |      |
|      |        |        |        |        |        |        |        |        |        |        |      |
|      |        |        |        |        |        |        |        |        |        |        | ~12-N |

POWER FEEDING SYSTEM FOR TELEPHONE TERMINAL IN LAN

CROSS REFERENCE TO RELATED APPLICATIONS

This is a continuation of parent application Ser. No. 10/726,511, filed Dec. 4, 2003, which is a continuation of grandparent application Ser. No. 09/352,332, filed Jul. 13, 1999 (now U.S. Pat. No. 6,681,013). The disclosures of the parent and grandparent applications are hereby incorporated in the present application by reference.

BACKGROUND OF THE INVENTION

1. Field of the Invention

The present invention relates to a system for feeding the power to a telephone terminal/terminals connected to a LAN (Local Area Network).

2. Description of the Related Art

In recent years, the so-called downsizing has been rapidly developed in the information processing field. For facilitating the downsizing, technology of LAN's has been developed for achieving distributed processing or horizontal distributed processing using a plurality of work stations or personal computers. Simultaneously, technology of LAN telephone terminals adapted for the LAN environment has also been developed. In this case, it is important to realize a power feeding system for the LAN telephone terminals.

Specifically, in transmission lines forming the LAN environment, data signals are flowing. Thus, it is difficult to use those transmission lines as power feed lines as in the public network. In particular, this is almost impossible in Ethernet LAN's wherein Manchester codes having no DC components are used as transmission codes. As is known in the art, the Manchester code is a code whose polarity is inverted at the center of a bit sequence so as to define a logical value of 1 or 0 by a direction of the inversion. Under the circumstances, the telephone terminals in the LAN receive the power from the commercial power source via AC adapters, respectively.

In this technique, however, since the respective telephone terminals receive the power from the commercial power source via the AC adapters, installation of the telephone terminals is troublesome. Further, every time an installed position of the telephone terminal is changed, an operator is required to make the installed position thereof clear relative to the network, thereby lacking in portability.

SUMMARY OF THE INVENTION

Therefore, it is an object of the present invention to provide a power feeding system in a LAN which is simple in structure while being capable of automatically judging whether a connected terminal is a telephone terminal or a terminal other than the telephone terminal, so as to automatically feed the power to the telephone terminal.

According to one aspect of the present invention, there is provided, in a LAN having terminals connected to each other via cables extending from a line concentrator, each of the cables including therein a signal line for delivering data signals for mutual communication between the terminals and the terminals including at least one telephone terminal, a power feeding system comprising a power feed line included in each of the cables; a power feed section for feeding power to the at least one telephone terminal via the corresponding power feed line; power feed control switching sections each for establishing or disabling communication between the power feed section and the corresponding power feed line; a current monitor section for detecting whether a value of current flowing in each of the power feed lines when each of the power feed lines is connected to the power feed section is within a preset current value range which represents a state where the telephone terminal is connected to the cable including therein the corresponding power feed line; and a control section for controlling the power feed control switching sections to connect the corresponding power feed lines to the power feed section in sequence, and for controlling each of the power feed control switching sections to stop feeding the power via the corresponding power feed line when the current monitor section detects that the value of the current flowing in the corresponding power feed line is outside the preset current value range, and to continue feeding the power via the corresponding power feed line when the current monitor section detects that the value of the current flowing in the corresponding power feed line is within the preset current value range.

It may be arranged that the power feeding system further comprises a link detecting section for monitoring each of the signal lines in sequence to detect whether link of the terminal connected to the corresponding signal line is established, wherein the control section controls the corresponding power feed control switching section to continue feeding the power to the corresponding power feed line when the link detecting section detects that the link of the terminal connected to the corresponding signal line is established, while the value of the current flowing in the corresponding power feed line is detected to be within the preset current value range.

It may be arranged that the power feeding system further comprises a link detecting section for monitoring each of the signal lines in sequence to detect whether link of the terminal connected to the corresponding signal line is established, wherein the control section controls the corresponding power feed control switching section to continue to stop feeding the power to the corresponding power feed line when the link detecting section detects that the link of the terminal connected to the corresponding signal line is established, while the corresponding power feed line is disconnected from the power feed section by the corresponding power feed control switching section.

It may be arranged that the power feeding system further comprises a line state monitor table for storing given states of the power feed line and the signal line of each of the cables, wherein the control section controls, by switching among the cables per given period, an operation of the whole power feeding system including the operations of the power feed control switching sections based on the line state monitor table.

BRIEF DESCRIPTION OF THE DRAWINGS

The present invention will be understood more fully from the detailed description given hereinbelow, taken in conjunction with the accompanying drawings.

In the drawings:

FIG. 2 is a diagram showing a structure of a line state monitor table used in the power feeding system shown in FIG. 1;

DESCRIPTION OF THE PREFERRED EMBODIMENT

Now, a power feeding system according to a preferred embodiment of the present invention will be described with reference to the accompanying drawings. In this embodiment, the present invention is applied to the Ethernet LAN using the 10BASE-T.

Figure 1:
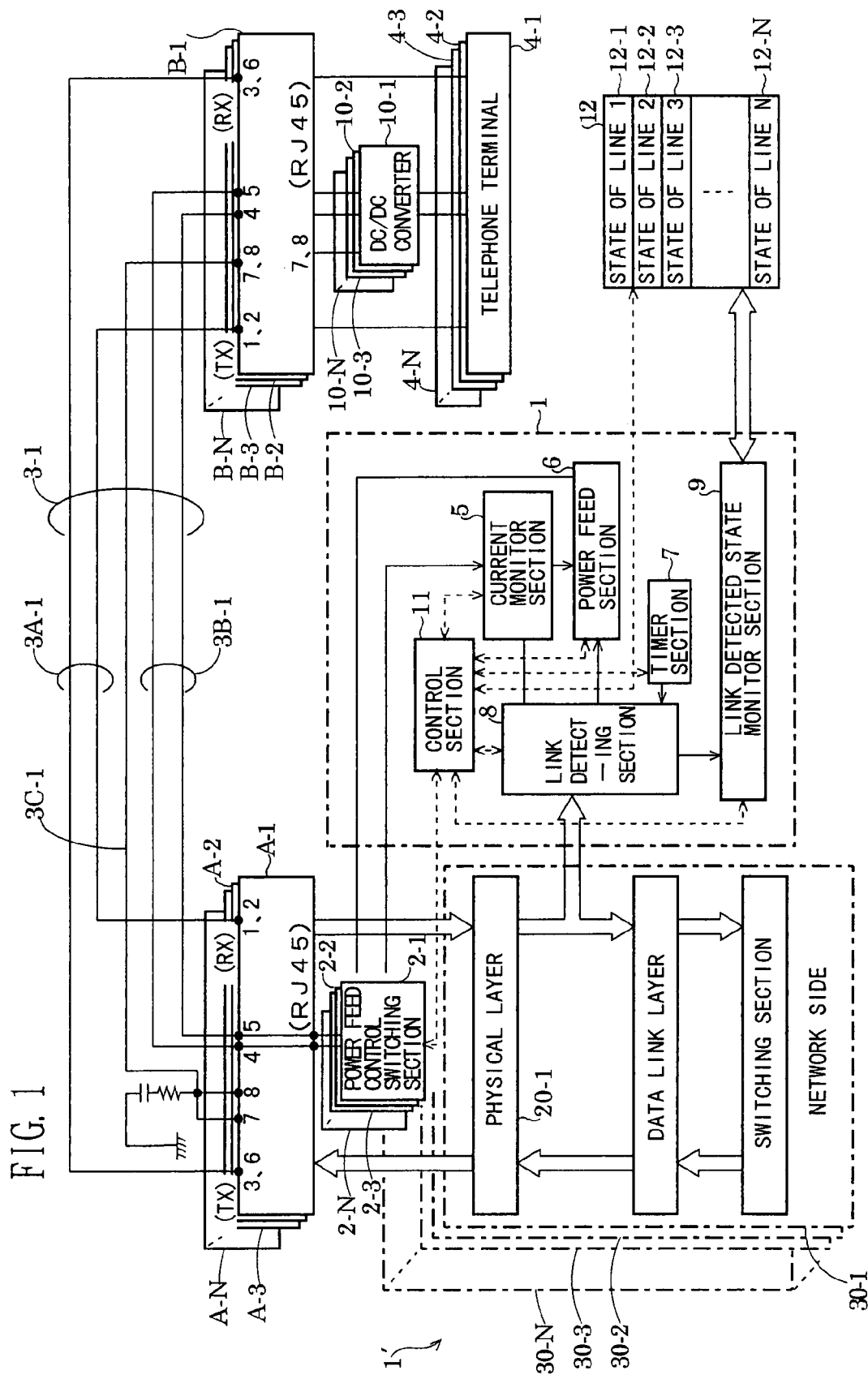
FIG. 1 is a block diagram of a power feeding system according to a preferred embodiment of the present invention.

FIG. 1 shows the structure of the power feeding system according to the preferred embodiment of the present invention. In FIG. 1, the power feeding system comprises a HUB 1' as a line concentrator having ports 30-1 to 30-N, cables 3-1 to 3-N (N is the maximum number corresponding to the number of the ports 30-1 to 30-N, which will be also applied to other components described hereinafter), terminals 4-1 to 4-N, connectors A-1 to A-N, and connectors B-1 to B-N. Although all the terminals 4-1 to 4-N are shown to be telephone terminals in FIG. 1 for facilitating explanation of the power feeding system, some of the terminals may be terminals other than the telephone terminals, of course. The terminals 4-1 to 4-N are connected to the HUB 1' in a star-shaped fashion via the corresponding cables 3-1 to 3-N with the corresponding connectors A-1 to A-N and B-1 to B-N, respectively.

The HUB 1' comprises a telephone terminal detecting section 1, power feed control switching sections 2-1 to 2-N and a line state monitor table 12.

The telephone terminal detecting section 1 comprises a current monitor section 5, a power feed section 6, a timer section 7, a link detecting section 8, a link detected state monitor section 9 and a control section 11. The telephone terminal detecting section 1 judges whether each of the connected terminals is a telephone terminal or not, and feeds the power when the connected terminal is judged to be the telephone terminal.

Each of the power feed control switching sections 2-1 to 2-N is in the form of a change-over switch for establishing or disabling connection between the power feed section 6 and corresponding one of pairs of power feed lines 3B-1 to 3B-N of the cables 3-1 to 3-N.

Each of the cables 3-1 to 3-N includes therein corresponding one of pairs of signal lines 3A-1 to 3A-N, corresponding one of pairs of the foregoing power feed lines 3B-1 to 3B-N, and corresponding one of grounding lines 3C-1 to 3C-N. The cables 3-1 to 3-N connect between the HUB 1' and the corresponding terminals 4-1 to 4-N, respectively. The signal lines are used for delivering data signals between the corresponding terminals via the HUB 1', while the power feed lines are used for feeding the DC power from the power feed section 6 to the corresponding telephone terminals. According to the 10BASE-T, unsealed twisted pair cables are used for the cables 3-1 to 3-N.

Each of the telephone terminals is a digital telephone adapted for the LAN. The maximum number of the telephone terminals is N (4-1 to 4-N) corresponding to the number of the ports 30-1 to 30-N of the HUB 1' as noted above. Each of the telephone terminals is provided with corresponding one of DC/DC converters 10-1 to 10-N. The DC/DC converter converts a DC voltage supplied from the HUB 1' or the telephone terminal detecting section 1 into a DC voltage suitable for the telephone terminal. Accordingly, if the terminal is not the telephone terminal, the DC/DC converter is not provided.

The connectors A-1 to A-N are used for connecting the corresponding cables 3-1 to 3-N to the HUB 1'.

The connectors B-1 to B-N are used for connecting the corresponding cables 3-1 to 3-N to the terminals 4-1 to 4-N, respectively.

According to the 10 BASE-T, an 8-pin connector RJ45 (8-pin modular jack) is used for each of the connectors A-1 to A-N and B-1 to B-N. Connect positions of 8 pins will be described later.

Now, the structure of the telephone terminal detecting section 1 will be described.

The current monitor section 5 measures a value of current flowing in the power feed lines of the corresponding cable when the telephone terminal detecting section 1 confirms whether the connected terminal is the telephone terminal or not.

The power feed section 6 feeds the power to the power feed lines 3B-1 to 3B-N via the power feed control switching sections 2-1 to 2-N, respectively.

The timer section 7 sets a monitor time for detecting the link establishment of the corresponding terminal relative to the LAN, which will be described later. The link establishment represents a standby state where the corresponding terminal is fully operable with the LAN.

The link detecting section 8 receives a signal from each of physical layers 20-1 to 20-N of the network side so as to confirm whether the corresponding telephone terminal or terminal other than the telephone terminal has established the link relative to the LAN.

The link detected state monitor section 9 continues to monitor the link establishment after the detection thereof by the link detecting section 8.

The control section 11 performs switching of operations, judgment of the states and others so as to control the whole power feeding system.

The line state monitor table 12 stores states of the respective cables 3-1 to 3-N under the control of the control section 11. The state of each cable is updated per monitor period when a change of the state occurs, and read out upon request.

Figure 2:
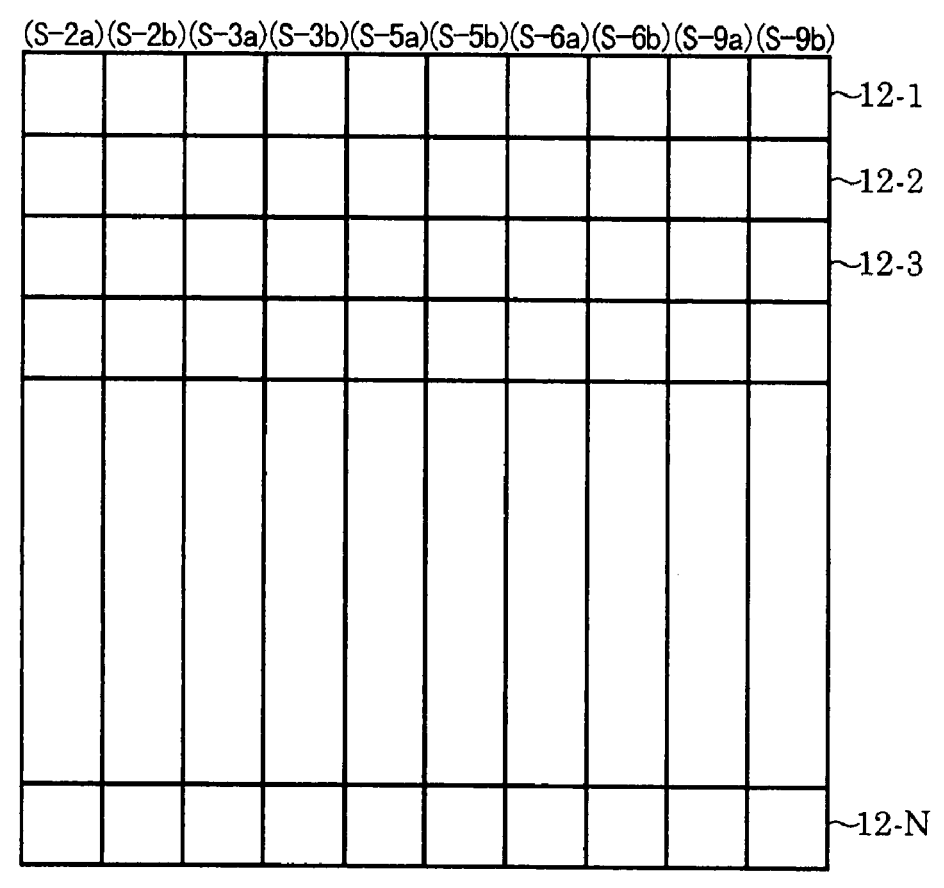

FIG. 2 shows a structure of the line state monitor table 12. As seen from FIG. 2, the table is divided into 10 regions in an X-axis direction and into regions 12-1 to 12-N in a Y-axis direction. As noted above, N represents the maximum number corresponding to the number of the ports 30-1 to 30-N of the HUB 1'. On the other hand, the 10 regions in the X-axis direction correspond to later-described operation stages.

Now, the connect positions of the 8 pins of each of the connectors A-1 to A-N will be described. The foregoing 8-pin connector RJ45 has No. 1 pin to No. 8 pin. No. 3 pin and No. 6 pin are connected to a transmission line of the network side, while No. 1 pin and No. 2 pin are connected to a reception line of the network side. Among No. 4 pin, No. 5 pin, No. 7 pin and No. 8 pin, two of them (No. 4 pin and No. 5 pin in this embodiment) are used for power feeding, while the remaining two (No. 7 pin and No. 8 pin in this embodiment) are open-circuit or grounded.

Similarly, the connect positions of the 8 pins of each of the connectors B-1 to B-N will be described. The foregoing 8-pin connector RJ45 has No. 1 pin to No. 8 pin. No. 1 pin and No. 2 pin are connected to a transmission line of the terminal side, while No. 3 pin and No. 6 pin are connected to a reception line of the terminal side. Among No. 4 pin, No. 5 pin, No. 7 pin and No. 8 pin, two of them (No. 4 pin and No. 5 pin in this embodiment) are used for power feeding, while the remaining two (No. 7 pin and No. 8 pin in this embodiment) are grounded to the terminal.

Further, No. 1 pin and No. 2 pin of each of the connectors A-1 to A-N are connected to No. 3 pin and No. 6 pin of corresponding one of the connectors B-1 to B-N, No. 3 pin and No. 6 pin of each of the connectors A-1 to A-N are connected to No. 1 pin and No. 2 pin of corresponding one of the connectors B-1 to B-N, and No. 4 pin, No. 5 pin, No. 7 pin and No. 8 pin of each of the connectors A-1 to A-N are connected to No. 4 pin, No. 5 pin, No. 7 pin and No. 8 pin of corresponding one of the connectors B-1 to B-N.

Now, an operation of the foregoing power feeding system will be described.

Figure 3:
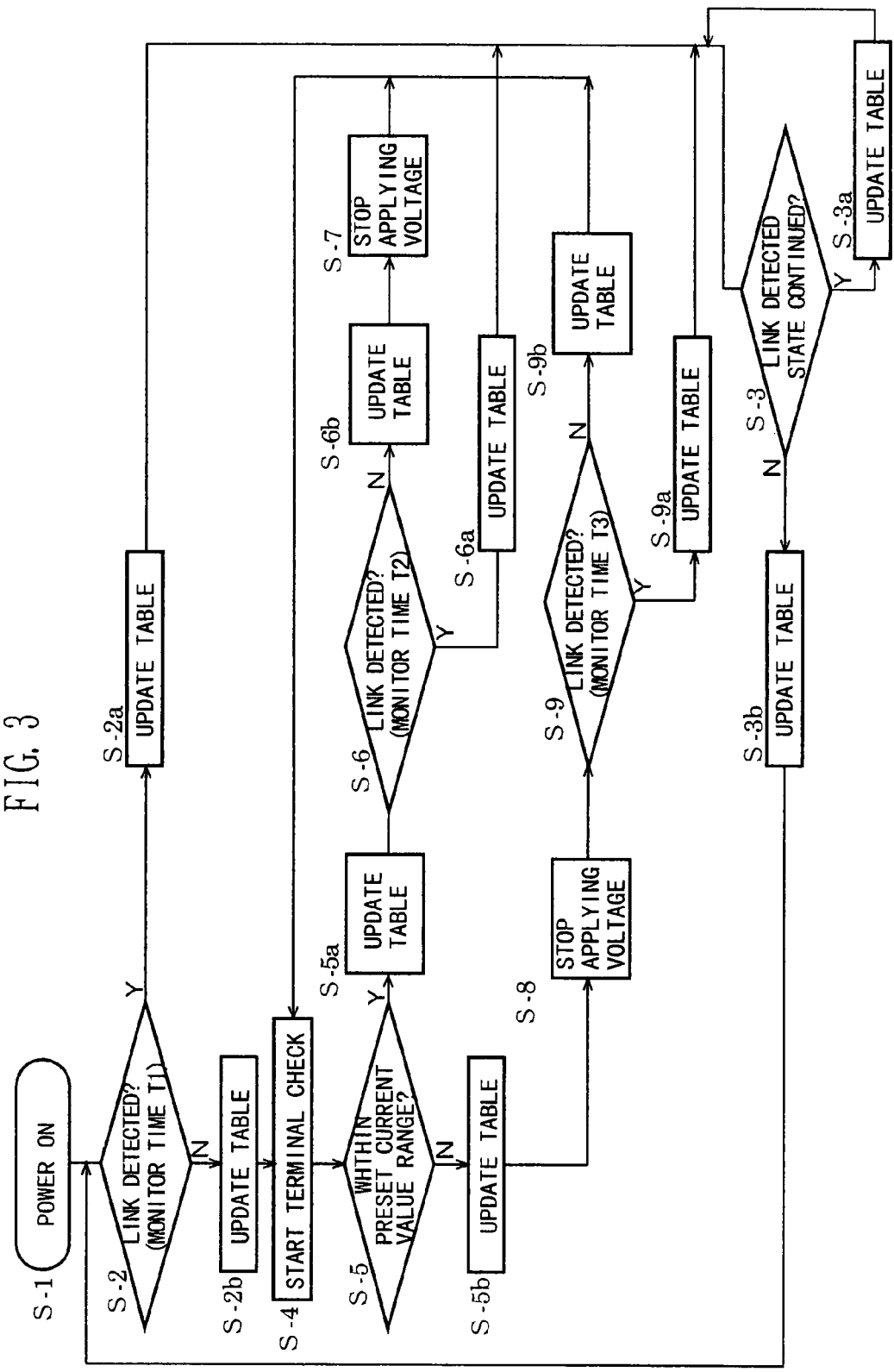
FIG. 3 is a diagram for explaining an operation of the power feeding system shown in FIG. 1.

Among the ports 30-1 to 30-N of the HUB 1', an operation only at the port 30-1 will be described with reference to FIG. 3 for brevity of description. As appreciated, an operation at each of the subsequent ports 30-2 to 30-N is the same as that at the port 30-1 represented by steps S-2 to S-9b shown in FIG. 3.

At step S-1, an operator turns on a power switch of the power feeding system. In this embodiment, a start switch of the LAN also works as the power switch of the power feeding system. Accordingly, the power feeding system is activated, and the routine proceeds to step S-2.

At step S-2, under the control of the control section 11, the link detecting section 8 monitors the network for a time T1 set by the timer section 7. If the link establishment of the terminal 4-1 is detected, the terminal 4-1 is judged to be a terminal, such as a work station or a personal computer, other than a telephone terminal. The reason is that since the terminal 4-1 is not yet fed with the power via the power feed lines 3B-1 at this time point, the terminal 4-1 is not detected if the terminal 4-1 is the telephone terminal. Subsequently, the routine proceeds to step S-2a where a logical value "1" is written into a region (S-2a) of a line 1 state 12-1 (corresponding to a state of the cable 3-1) in the line state monitor table 12, and then proceeds to step S-3. On the other hand, if the link establishment is not detected at step S-2, the terminal 4-1 may be a terminal other than a telephone terminal which is in a power-off state, or a telephone terminal awaiting the power feeding. It may also be considered that no terminal is connected. In this case, the routine proceeds to step S-2b where a logical value "1" is written into a region (S-2b) of the line 1 state 12-1, and then proceeds to step S-4.

At step S-3, under the control of the control section 11, the link detected state monitor section 9 continues to monitor the link detected state in place of the link detecting section 8. If this link detected state continues, the network is in a normal operation state with respect to the port 30-1. In this case, the routine proceeds to step S-3a where a logical value "1" is written into a region (S-3a) of the line 1 state 12-1. On the other hand, if the state is changed to non-detection of the link establishment, the routine proceeds to step S-3b where a logical value "1" is written into a region (S-3b) of the line 1 state 12-1, and then returns to step S-2 for executing step S-2 and subsequent steps.

On the other hand, if the link establishment is not detected at step S-2, the control section 11 executes a terminal check in the following manner:

Specifically, at step S-4, the control section 11 controls the power feed control switching section 2-1 to establish connection between No. 4 and No. 5 pins of the connector A-1 and the power feed section 6 so that the DC voltage is applied to the power feed lines 3B-1 of the cable 3-1. Then, the routine proceeds to step S-5.

At step S-5, under the control of the control section 11, the current monitor section 5 measures a value of current flowing in No. 4 and No. 5 pins of the connector A-1 and judges whether the measured current value is within a preset current value range. The preset current value range is a given range across an adequate current value obtained by connecting a telephone terminal. According to the type of the connected telephone terminal, the upper and lower limits of the current value range are determined. The current value range may be determined experientially.

Therefore, if the foregoing measured current value is within the preset current value range, probability is high that the terminal 4-1 is a telephone terminal. In this case, the voltage continues to be applied across No. 4 and No. 5 pins of the connector A-1. Subsequently, the routine proceeds to step S-5a where a logical value "1" is written into a region (S-5a) of the line 1 state 12-1, and then proceeds to step S-6. On the other hand, if the foregoing measured current value is outside the preset current value range, probability is high that the terminal 4-1 is a terminal other than a telephone terminal. The reason is that if the terminal 4-1 is not a telephone terminal, No. 4 and No. 5 pins of the connector A-1 are grounded to the terminal 4-1 or open-circuit at the side of the connector B-1. Specifically, when grounded, the foregoing measured current value becomes greater than the preset current value range. In this case, however, it is designed that current higher than an upper limit set in view of safety is prevented from flowing. On the other hand, when open-circuit, almost no current flows. In this case, the routine proceeds to step S-5b where a logical value "1" is written into a region (S-5b) of the line 1 state 12-1, and then proceeds to step S-8 where the voltage feeding is stopped.

At step S-6, the link detecting section 8 monitors the network for a time T2 set by the timer section 7. If the link establishment of the terminal 4-1 is detected, the routine proceeds to step S-6a where a logical value "1" is written into a region (S-6a) of the line 1 state 12-1, and then proceeds to step S-3 where, as described above, the link detected state monitor section 9 continues to monitor the link detected state in place of the link detecting section 8. In this case, the terminal 4-1 is a telephone terminal. As long as this link detected state continues, the network is in a normal operation state with respect to the port 30-1, and the current continues to be supplied to the telephone terminal 4-1 within the preset current value range. On the other hand, if the link detected state is not continued, the routine returns to step S-2 for executing step S-2 and subsequent steps.

On the other hand, if the link establishment of the terminal 4-1 is not detected at step S-6, probability is high that the terminal 4-1 is a terminal other than a telephone terminal which is in a power-off state. The reason is that since the voltage continues to be applied to the power feed lines 3B-1, if the terminal 4-1 is a telephone terminal, the link establishment thereof should be detected. In this case, the routine proceeds to step S-6b where a logical value "1" is written into a region (S-6b) of the line 1 state 12-1, and then proceeds to step S-7.

At step S-7, the voltage feeding to No. 4 and No. 5 pins of the connector A-1 is stopped. Subsequently, the routine returns to step S-4 where the terminal check is started again. If the terminal 4-1 is a telephone terminal, a loop of steps S-4, S-5, S-6 and S-7 is repeated until the link establishment is detected at step S-6. On the other hand, if the terminal 4-1 is a terminal other than a telephone terminal, the foregoing loop is repeated until the routine proceeds from step S-5 to step S-8. Since the value of current flowing in No. 4 and No. 5 pins of the connector A-1 during repetition of the foregoing loop is within the preset current value range, even if the loop repetition extends over a long time, no particular problem is raised.

Explanation will be made of the case wherein the routine proceeds from step S-5 to step S-8. As described at step S-5, if the foregoing measured current value is outside the preset current value range, probability is high that the terminal 4-1 is a terminal other than a telephone terminal. In this case, the routine proceeds to step S-8 where the voltage feeding to No. 4 and No. 5 pins of the connector A-1 is stopped, and then proceeds to step S-9.

At step S-9, the link detecting section 8 monitors the network for a time T3 set by the timer section 7. If the link establishment of the terminal 4-1 is detected, the routine proceeds to step S-9a where a logical value "1" is written into a region (S-9a) of the line 1 state 12-1, and then proceeds to step S-3 where, as described above, the link detected state monitor section 9 continues to monitor the link detected state in place of the link detecting section 8. In this case, the terminal 4-1 is a terminal other than a telephone terminal. As long as this link detected state continues, the network is in a normal operation state with respect to the port 30-1. Since the voltage feeding is stopped at step S-8, no current flows in the power feed lines 3B-1.

On the other hand, if the link establishment is not detected at step S-9, the routine proceeds to step S-9b where a logical value "1" is written into a region (S-9b) of the line 1 state 12-1, and then returns to step S-4 to repeat a loop of steps S-4, S-5, S-8 and S-9 until the link establishment is detected at step S-9, i.e. until the terminal 4-1 is turned on. Alternatively, if no terminal is connected, the loop is repeated until a telephone terminal or a terminal other than the telephone terminal which is in a power-on state is connected. Since the value of current flowing in No. 4 and No. 5 pins of the connector A-1 during repetition of this loop is not higher than the upper limit set in view of safety, even if the loop repetition extends over a long time, no particular problem is raised.

Figure 4:
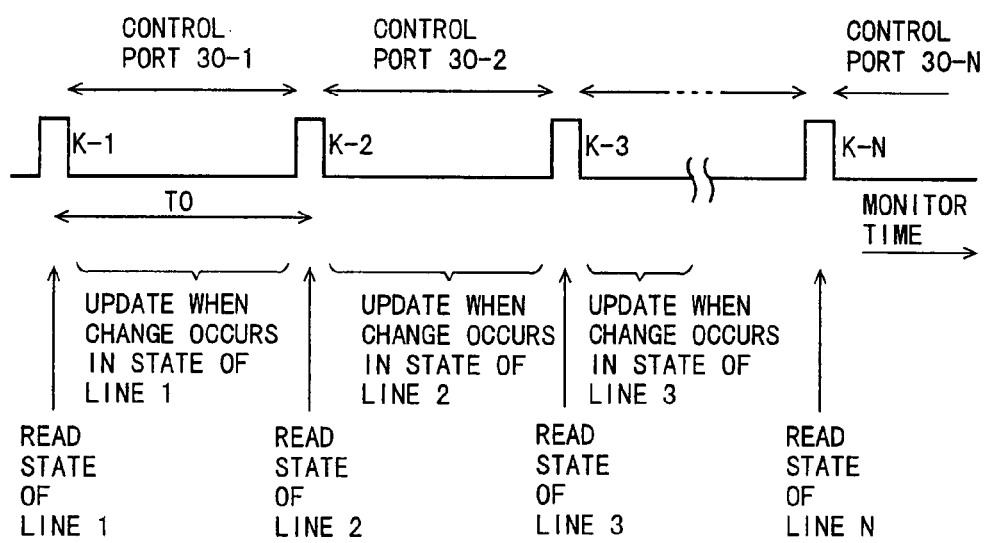
FIG. 4 is a diagram for explaining sequential operations of the power feeding system shown in FIG. 1.

FIG. 4 is a diagram showing a state wherein the telephone terminal detecting section 1 controls the port 30-1 through the port 30-N in sequence. In FIG. 4, K-1 to K-N represent clock pulses for starting the control of the corresponding ports 30-1 to 30-N, respectively. The clock period is set to T0 by the timer section 7.

In response to the clock pulse K-1, the control section 11 reads out the line 1 state 12-1 from the line state monitor table 12. The read-out data are previous data (T0×N prior data) and given by logical values "1" and "0" as described above.

It is assumed that the control section 11 reads out "1" from the region (S-3a) and "0" from the region (S-3b) of the line 1 state 12-1. In this case, the control section 11 executes step S-3 and judges the port 30-1 to be in an effective state as long as the link detected state is continued, so that the control section 11 maintains the current state with respect to the port 30-1. On the other hand, if it is assumed that the control section 11 reads out "1" from the region (S-3b) of the line 1 state 12-1, the control section 11 judges that the state of the cable 3-1 has been changed, resets all the data of the line 1 state 12-1 to zero, and returns to step S-2 to execute step S-2 and subsequent steps. Further, it is assumed that the control section 11 reads out "0" from the region (S-3a) and "0" from the region (S-3b) of the line 1 state 12-1. In this case, the control section 11 judges that the terminal check is finished in the middle of one of the foregoing loops having "1" in the region (S-6b) or (S-9b), and returns to step S-4 through that loop so as to restart the terminal check.

The control section 11 executes the operation in the foregoing manner and continues execution thereof up to receipt of the clock pulse K-2. In response to the clock pulse K-2, the control section 11 switches from the port 30-1 to the port 30-2. Simultaneously, the control section 11 reads out the line 2 state 12-2 from the line state monitor table 12 and starts the control of the port 30-2. Thereafter, the control section 11 controls the subsequent ports 30-3 through 30-N similarly in response to the clock pulses K-3 through K-N.

More accurate cable controls may be realized by using other data on the line state monitor table 12 as well.

According to the foregoing preferred embodiment of the present invention, since it is not necessary for the respective telephone terminals to receive the power from the commercial power source via the AC adapters, the installation of the telephone terminals is facilitated. Further, since it is not necessary for the operator to make the installed position of the telephone terminal clear relative to the network every time the installed position thereof is changed, the portability is improved. In addition, since the voltage applied to the cable connecting between the HUB and the telephone terminal is low, it is possible to use the unsealed twisted pair cable as the cable and the modular jacks as the connectors at both ends thereof, so that the installation of the telephone terminal is further facilitated and reduced in cost. As appreciated, since it is sufficient only to connect the modular jack to the HUB upon connecting the telephone terminal to the LAN, the portability is further improved. Moreover, since N cables can be controlled only by one telephone terminal detecting section, the system is simple in structure.

While the present invention has been described in terms of the preferred embodiment, the invention is not to be limited thereto, but can be embodied in various ways without departing from the principle of the invention as defined in the appended claims. For example, the present invention is not limited to the Ethernet LAN using the 10BASE-T, but is also applicable to all star-shaped LAN's wherein terminals are connected in a star-shaped fashion by a HUB or another line concentrator replacing it.

What is claimed is:

1. An improved LAN having terminals connected to a line concentrator via signal lines for carrying signals between the terminals and the line concentrator, wherein the improvement comprises:

power feed lines connected to the terminals; and
a power feeding system that includes
  a power feed section for selectively feeding power to the power feed lines,
  a current monitor section for detecting whether current is flowing to each terminal and, if so, whether the current has a value within a preset current range which indicates that the respective terminal receiving the current is a telephone terminal,
  a control section for controlling the power feed section to stop feeding power to particular terminals if the current monitor section detects that each current flowing to those terminals has a value that is outside the preset current value range, and to continue feeding current to particular terminals if the current monitor section detects that each current flowing to those terminals has a value within the preset current range, and
  a line state monitor table for storing given states of the power feed lines and the signal lines,
  wherein the control section controls operation of the power feeding system based on the line state monitor table.

2. The improved LAN of claim 1, wherein the power feeding system further comprises:
a link detecting section for sequentially monitoring the signal lines to detect whether links to corresponding ones of the terminals exist,
wherein the control section controls the power feeding section to continue feeding current to terminals to which links exist if each current to the terminals to which links exist is detected by the current monitor section to be within the preset current range.

3. The improved LAN of claim 2,
wherein the control section switches periodically among the power feed and signal lines of the terminals to control operation of the power feeding system based on the line state monitor table.

4. The improved LAN of claim 1, wherein the power feeding system further comprises:
a link detecting section for sequentially monitoring the signal lines to detect whether links to corresponding ones of the terminals exist,
wherein if terminals to which links exist are not being fed current by the power feeding section, the control section controls the power feed section to continue not feeding them power.

5. The improved LAN of claim 4,
wherein the control section switches periodically among the power feed and signal lines of the terminals to control operation of the power feeding system based on the line state monitor table.

6. The improved LAN of claim 1,
wherein the control section switches periodically among the power feed and signal lines of the terminals to control operation of the power feeding system based on the line state monitor table.

7. The improved LAN of claim 1, further comprising cables connected to the terminals, the cables including the signal lines and the power feed lines.

8. A power feeding system for use with a LAN having a line concentrator that is connected to terminals by cables, the cables including signal lines for carrying signals between the terminals and the line concentrator, said power feeding system comprising:
power feed lines in the cables in addition to the signal lines; and
a power feeding unit that includes
a power feed section for selectively feeding power to the power feed lines,
a monitor section for detecting whether power is being supplied to each terminal and, if so, whether the power has a value within a preset range which indicates that the respective terminal receiving the power is a telephone terminal,
a control section for controlling the power feed section to stop feeding power to particular terminals if the monitor section detects that each power which is being supplied to those terminals has a value that is outside the preset range, and to continue feeding power to particular terminals if the monitor section detects that each power which is being supplied to those terminals has a value within the preset range, and
a line state monitor table for storing given states of the power feed lines and the signal lines,
wherein the control section controls operation of the power feeding unit based on the line state monitor table.

9. The power feeding system of claim 8, wherein the power feeding unit comprises:
a link detecting section for sequentially monitoring the signal lines to detect whether links to corresponding ones of the terminals exist,
wherein the control section controls the power feeding section to continue feeding power to terminals to which links exist if each power which is being fed to the terminals to which links exist is detected by the monitor section be within the preset range.

10. The power feeding system of claim 9,
wherein the control section switches periodically among the power feed and signal lines of the terminals to control operation of the power feeding system based on the line state monitor table.

11. The power feeding system of claim 8, wherein the power feeding unit comprises:
a link detecting section for sequentially monitoring the signal lines to detect whether links to corresponding ones of the terminals exist,
wherein if terminals to which links exist are not being fed power by the power feeding section, the control section controls the power feed section to continue not feeding them power.

12. The power feeding system of claim 11,
wherein the control section switches periodically among the power feed and signal lines of the terminals to control operation of the power feeding system based on the line state monitor table.

13. The power feeding system of claim 8,
wherein the control section switches periodically among the power feed and signal lines of the terminals to control operation of the power feeding system based on the line state monitor table.

14. A power feeding system for use with a LAN having a line concentrator that is connected to terminals by cables, the cables including signal lines for carrying signals between the terminals and the line concentrator, said power feeding system comprising:
power feed lines in the cables in addition to the signal lines; and
a power feeding unit that includes
a power feed section for selectively feeding power to the power feed lines,
a monitor section for detecting whether power is being supplied to each terminal and, if so, whether the power has a value within a preset range which indicates that the respective terminal receiving the power is a telephone terminal,
a control section for controlling the power feed section to apply a voltage to the terminals, to stop applying voltage to particular terminals if the monitor section detects that each power which is being supplied to those terminals has a value that is outside the preset range, and to continue applying voltage to particular terminals if the monitor section detects that each power which is being supplied to those terminals has a value within the preset range, and
a line state monitor table for storing given states of the power feed lines and the signal lines,
wherein the control section controls operation of the power feeding system based on the line state monitor table.

15. The power feeding system of claim 14, wherein the power feeding unit comprises:
a link detecting section for sequentially monitoring the signal lines to detect whether links to corresponding ones of the terminals exist,
wherein the control section controls the power feeding section to continue applying voltage to terminals to which links exist if each power which is being fed to the terminals to which links exist is detected by the monitor section be within the preset range.

16. The power feeding system of claim 15, wherein the control section switches periodically among the power feed and signal lines of the terminals to control operation of the power feeding system based on the line state monitor table.

17. The power feeding system of claim 14, wherein the power feeding unit comprises:
   a link detecting section for sequentially monitoring the signal lines to detect whether links to corresponding ones of the terminals exist,
   wherein if terminals to which links exist are not being fed power by the power feeding section, the control section controls the power feed section to continue not feeding them power.

18. The power feeding system of claim 17,
wherein the control section switches periodically among the power feed and signal lines of the terminals to control operation of the power feeding system based on the line state monitor table.

19. The power feeding system of claim 14,
wherein the control section switches periodically among the power feed and signal lines of the terminals to control operation of the power feeding system based on the line state monitor table.

\* \* \* \* \*